US011644097B2

(12) United States Patent
Miura et al.

(10) Patent No.: US 11,644,097 B2
(45) Date of Patent: May 9, 2023

(54) VEHICLE

(71) Applicant: SUBARU CORPORATION, Tokyo (JP)

(72) Inventors: Shuntaro Miura, Tokyo (JP); Kenji Inoue, Tokyo (JP); Akihiro Kawakami, Tokyo (JP); Takahiro Okada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/863,788

(22) Filed: Jul. 13, 2022

(65) Prior Publication Data
US 2023/0026614 A1   Jan. 26, 2023

(30) Foreign Application Priority Data

Jul. 20, 2021 (JP) .............................. JP2021-119898

(51) Int. Cl.
| F16H 61/16 | (2006.01) |
| F16H 59/48 | (2006.01) |
| F16H 59/36 | (2006.01) |
| F16H 59/18 | (2006.01) |
| F16H 59/00 | (2006.01) |
| F16H 59/38 | (2006.01) |

(52) U.S. Cl.
CPC ............. *F16H 61/16* (2013.01); *F16H 59/18* (2013.01); *F16H 59/36* (2013.01); *F16H 59/48* (2013.01); *F16H 2059/003* (2013.01); *F16H 2059/183* (2013.01); *F16H 2059/385* (2013.01); *F16H 2061/163* (2013.01)

(58) Field of Classification Search
CPC .... F16H 2061/163; F16H 61/16; F16H 59/18; F16H 59/36; F16H 59/48; F16H 2059/003; F16H 2059/1853; F16H 2059/385; B60W 30/045; B60W 10/10; B60W 2520/125; B60W 2510/1015
USPC .......................................................... 701/51
See application file for complete search history.

(56) References Cited

U.S. PATENT DOCUMENTS 6,030,315 A * 2/2000 Bellinger .............. B60W 10/06
477/121
11,524,679 B2 * 12/2022 Hu ........................ B60W 10/06
(Continued)

FOREIGN PATENT DOCUMENTS

JP   2013-142436 A   7/2013

*Primary Examiner* — Roger L Pang
(74) *Attorney, Agent, or Firm* — Troutman Pepper Hamilton Sanders LLP (57) ABSTRACT

A vehicle includes an engine, a torque converter, a transmission, and a control device. The torque converter is coupled to the engine. The transmission is coupled to the torque converter. The control device is configured to control operation of the transmission. The control device includes a controller configured to perform shift hold control to prevent upshift of the transmission based on a lateral acceleration value of the vehicle. The controller is configured to permit the upshift of the transmission by only one gear shift stage in a case where a predetermined condition is met in the shift hold control. The predetermined condition includes a condition that an index value indicating a rotation speed of an output shaft of the torque converter be higher than a first threshold value.

16 Claims, 8 Drawing Sheets

(56) References Cited

U.S. PATENT DOCUMENTS

| | | | |
|---|---|---|---|
| 2007/0270279 A1* | 11/2007 | Saitoh | F16H 61/16 |
| | | | 477/110 |
| 2013/0179044 A1 | 7/2013 | Ishikawa et al. | |
| 2021/0372519 A1* | 12/2021 | Park | F16H 59/44 |

* cited by examiner

VEHICLE

CROSS-REFERENCE TO RELATED APPLICATION

The present application claims priority from Japanese Patent Application No. 2021-119898 filed on Jul. 20, 2021, the entire contents of which are hereby incorporated by reference.

BACKGROUND

The disclosure relates to a vehicle.

Japanese Unexamined Patent Application Publication No. 2013-142436 describes shift hold control that is performed to keep a gear shift stage to a low shift stage side by preventing upshift while a vehicle is cornering.

SUMMARY

An aspect of the disclosure provides a vehicle including an engine, a torque converter, a transmission, and a control device. The torque converter is coupled to the engine. The transmission is coupled to the torque converter. The control device is configured to control operation of the transmission. The control device includes a controller configured to perform shift hold control to prevent upshift of the transmission based on a lateral acceleration value of the vehicle. The controller is configured to permit the upshift of the transmission by only one gear shift stage in a case where a predetermined condition is met in the shift hold control. The predetermined condition includes a condition that an index value indicating a rotation speed of an output shaft of the torque converter be higher than a first threshold value.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Shift hold control in the related art has room for improvement in that prevention of upshift may cause an engine rotation speed to be excessively increased, which results in a driver experiencing a sense of discomfort.

It is desirable to suppress an occurrence of a sense of discomfort of the driver.

Embodiments of the disclosure will herein be described in detail with reference to the drawings. Specific sizes, materials, numerical values, and so on described in the embodiments are examples for facilitating understanding of the disclosure and do not limit the disclosure unless otherwise specified. In the specification and the drawings, the same reference numerals and characters are given to components having substantially the same functions and configurations and a detailed description of such components is not repeated. In addition, illustration of components that are not directly related to the disclosure is omitted herein.

Figure 1:
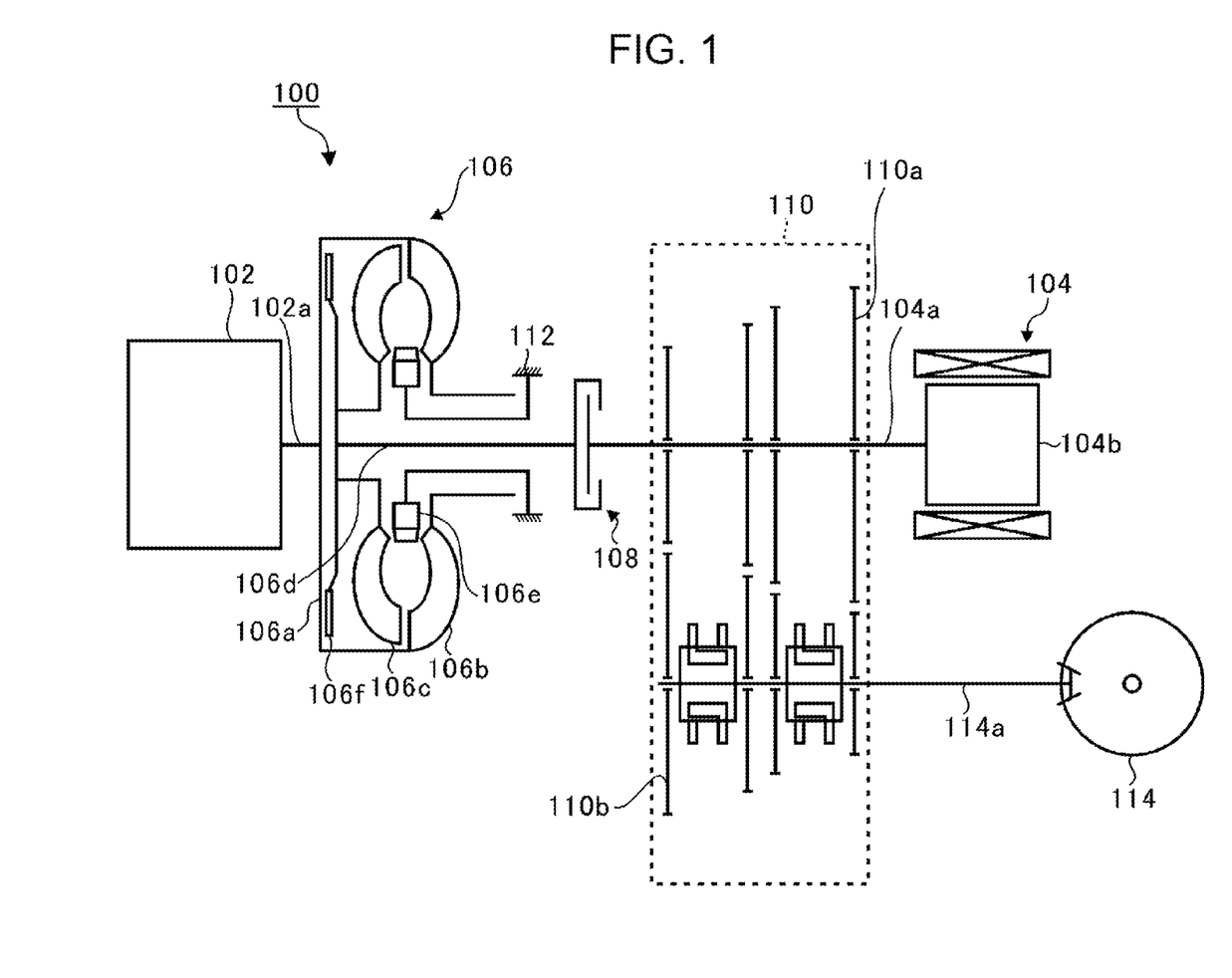
FIG. 1 is a schematic diagram illustrating the configuration of a driving system of a vehicle according to an embodiment of the disclosure.

FIG. 1 is a schematic diagram illustrating the configuration of a driving system of a vehicle 100 according to an embodiment. Referring to FIG. 1, the vehicle 100 includes an engine 102 and a motor 104 as driving sources. Although a hybrid vehicle including the engine 102 and the motor 104 as the driving sources for running is described as the vehicle 100 in the present embodiment, the vehicle 100 may be an engine vehicle including the engine 102 alone as the driving source for running.

A crank shaft 102a is disposed in the engine 102 so as to pass through the engine 102. A piston is reciprocated using explosion pressure in a combustion chamber to rotate the crank shaft 102a.

The motor 104 is, for example, a three-phase brushless direct-current (DC) motor having a U phase, a V phase, and a W phase. A rotating shaft 104a of the motor 104 is fixed to a rotor 104b. The motor 104 is coupled to a battery (not illustrated) and is rotationally driven with electric power supplied from the battery. The motor 104 may generate the electric power in response to rotation of the rotating shaft 104a during deceleration of the vehicle 100 and the battery may be charged with the generated electric power.

A torque converter 106, a hydraulic clutch 108, and a transmission 110 are provided from the engine 102 side between the crank shaft 102a of the engine 102 and the rotating shaft 104a of the motor 104.

In the torque converter 106, a pump impeller 106b is fixed to a front cover 106a coupled to the crank shaft 102a. A turbine runner 106c coupled to a turbine shaft 106d, which is an output shaft of the torque converter 106, is disposed in the front cover 106a so as to be opposed to the pump impeller 106b. A stator 106e is disposed between the inner periphery side of the pump impeller 106b and the inner periphery side of the turbine runner 106c. Working fluid is sealed in the torque converter 106. The stator 106e is fixed to a housing 112 in which the torque converter 106, the hydraulic clutch 108, the transmission 110, and so on are housed.

The pump impeller 106b and the turbine runner 106c are each provided with multiple blades. The working fluid is delivered to the outer periphery side in response to rotation of the pump impeller 106b, and the turbine runner 106c is rotated with the working fluid delivered to the turbine runner 106c. Power is transmitted from the crank shaft 102a to the turbine runner 106c in the above manner.

The stator 106e recirculates the working fluid output from the turbine runner 106c into the pump impeller 106b by varying the flow direction of the working fluid to facilitate the rotation of the pump impeller 106b. Accordingly, the torque converter 106 is capable of increasing transmission torque.

A clutch plate 106f fixed to the turbine shaft 106d is disposed so as to be opposed to the inner surface of the front cover 106a. Pressing of the clutch plate 106f against the front cover 106a with hydraulic pressure causes the power to be transmitted from the crank shaft 102a to the turbine shaft 106d. In addition, control of the hydraulic pressure to cause the clutch plate 106f to abut the front cover 106a while the clutch plate 106f sliding enables the power transmitted from the crank shaft 102a to the turbine shaft 106d to be adjusted.

The vehicle 100 having the above configuration switches the coupling state of the hydraulic clutch 108 to run using one of the engine 102 and the motor 104 or both the engine 102 and the motor 104. The hydraulic clutch 108 is capable of switching between a blocking state in which the transmission of the power between the turbine shaft 106d and the rotating shaft 104a is blocked and a connection state in which the power is transmitted between the turbine shaft 106d and the rotating shaft 104a. The vehicle 100 is capable of switching between motor drive, engine drive, and hybrid drive. In the motor drive, the vehicle 100 runs using the motor 104 with the hydraulic clutch 108 being set to the blocking state. In the engine drive, the vehicle 100 runs using the engine 102 with the hydraulic clutch 108 being set to the connection state and the motor 104 being caused to idle or function as a generator. In the hybrid drive, the vehicle 100 runs using both the engine 102 and the motor 104 with the hydraulic clutch 108 being set to the connection state to drive the engine 102 and the motor 104.

In the present embodiment, the transmission 110 is a multi-stage transmission and has, for example, nine gear shift stages. The transmission 110 includes multiple first gears 110a provided on the rotating shaft 104a and multiple second gears 110b provided on an output shaft 114a. The output shaft 114a is disposed so as to be parallel to the rotating shaft 104a. A driving wheel 114 is coupled to the output shaft 114a. The power transmitted from the engine 102 and/or the motor 104 to the rotating shaft 104a is subjected to gear shift through the transmission 110 and is transmitted to the driving wheel 114.

Figure 2:
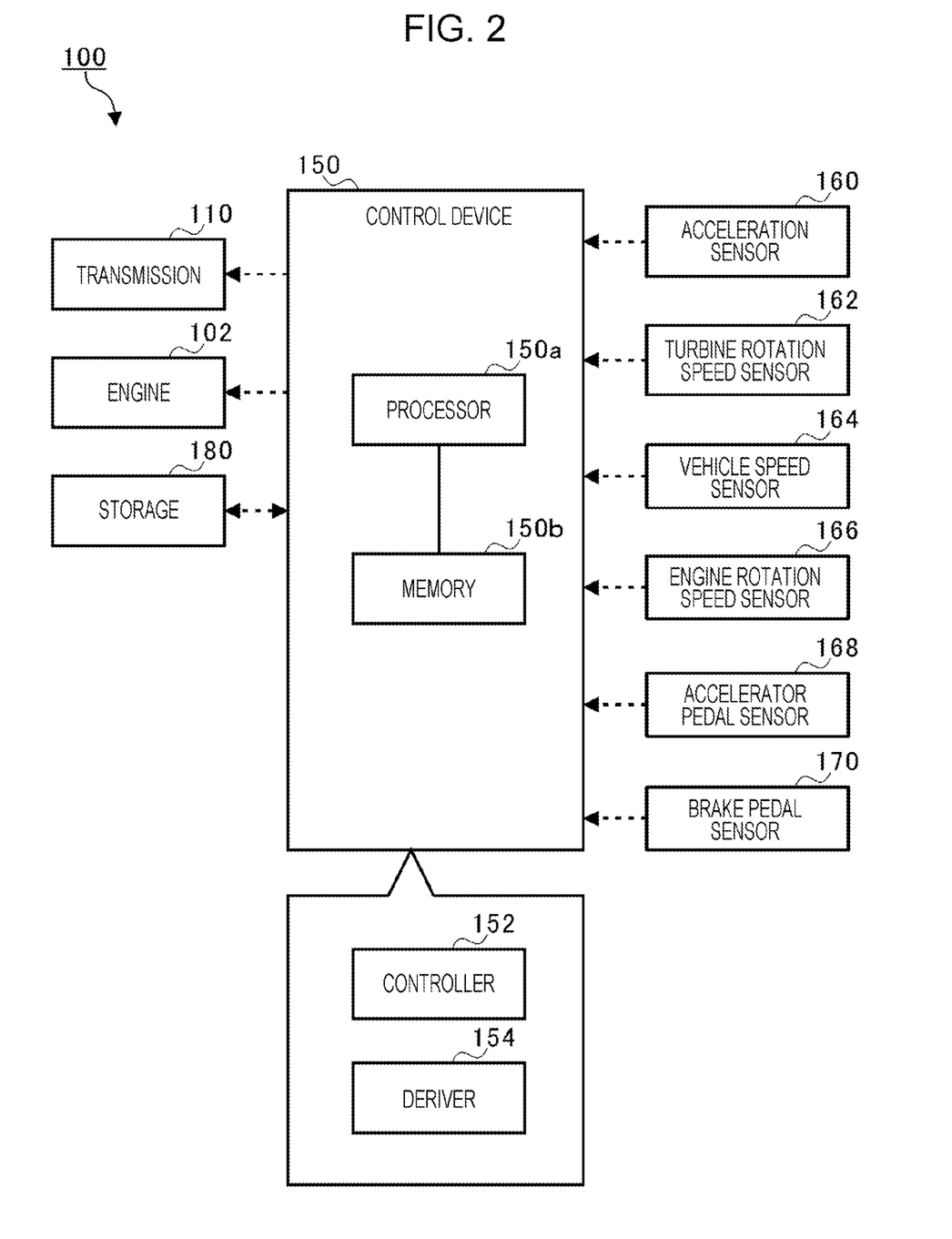
FIG. 2 is a block diagram illustrating the configuration of a control system of the vehicle according to the embodiment.

FIG. 2 is a block diagram illustrating the configuration of a control system of the vehicle 100 according to the present embodiment. Referring to FIG. 2, broken-line arrows indicate the directions of control signals. As illustrated in FIG. 2, the control system of the vehicle 100 includes the transmission 110, the engine 102, a control device 150, an acceleration sensor 160, a turbine rotation speed sensor 162, a vehicle speed sensor 164, an engine rotation speed sensor 166, an accelerator pedal sensor 168, a brake pedal sensor 170, and a storage 180.

The acceleration sensor 160 detects an acceleration in a left and right direction of the vehicle 100, that is, a lateral acceleration, and an acceleration in a front-back direction of the vehicle 100, that is, a deceleration. The lateral acceleration may be also referred to as a lateral acceleration value, the acceleration in a front-back direction of the vehicle 100 may be also referred to as an acceleration value, and the deceleration may be also referred to as a deceleration value. The turbine rotation speed sensor 162 detects a rotation speed of the turbine shaft 106d, which is the output shaft of the torque converter 106. The vehicle speed sensor 164 detects a vehicle speed of the vehicle 100. The engine rotation speed sensor 166 detects an engine rotation speed of the engine 102. The accelerator pedal sensor 168 detects the degree of depression of an accelerator pedal (not illustrated). The brake pedal sensor 170 detects the degree of depression of a brake pedal (not illustrated).

A gear shift map is stored in the storage 180. Gear shift conditions between the respective gear shift stages in the multi-stage shift are set in the gear shift map. For example, upshift conditions are set in the gear shift map for the respective gear shifts from the first speed to the second speed, from the second speed to the third speed, from the third speed to the fourth speed, from the fourth speed to the fifth speed, from the fifth speed to the sixth speed, from the sixth speed to the seventh speed, from the seventh speed to the eighth speed, and from the eighth speed to the ninth speed in the multi-stage shift. In addition, downshift conditions are set in the gear shift map for the respective gear shifts from the ninth speed to the eighth speed, from the eighth speed to the seventh speed, from the seventh speed to the sixth speed, from the sixth speed to the fifth speed, from the fifth speed to the fourth speed, from the fourth speed to the third speed, from the third speed to the second speed, and from the second speed to the first speed in the multi-stage shift.

The gear shift conditions including the upshift conditions and the downshift conditions are defined based on the vehicle speed of the vehicle 100, which is detected by the vehicle speed sensor 164, and an accelerator opening calculated from the degree of depression of the accelerator pedal, which is detected by the accelerator pedal sensor 168. The accelerator opening may be also referred to as an accelerator opening degree.

The control device 150 includes one or more processors 150a and one or more memories 150b connected to the processors 150a. The memory 150b includes a read-only memory (ROM) in which programs and so on are stored and a random access memory (RAM) serving as a working area. The processor 150a in the control device 150 controls the entire vehicle 100 in cooperation with the programs. The processor 150a in the control device 150 executes the programs to function as a controller 152 and a deriver 154.

The controller 152 controls the operation of the transmission 110 to perform the shift hold control for preventing the upshift of the transmission 110 based on the lateral acceleration of the vehicle 100. This will be described in detail below. In addition, the controller 152 permits the upshift of one gear shift stage in the shift hold control if predetermined conditions described in detail below are met.

The deriver 154 derives a driving intensity of the driver of the vehicle 100. This will be described in detail below. In the present embodiment, the driving intensity is an index indicating the intensity of the driving of the vehicle 100 by the driver.

Figure 3:
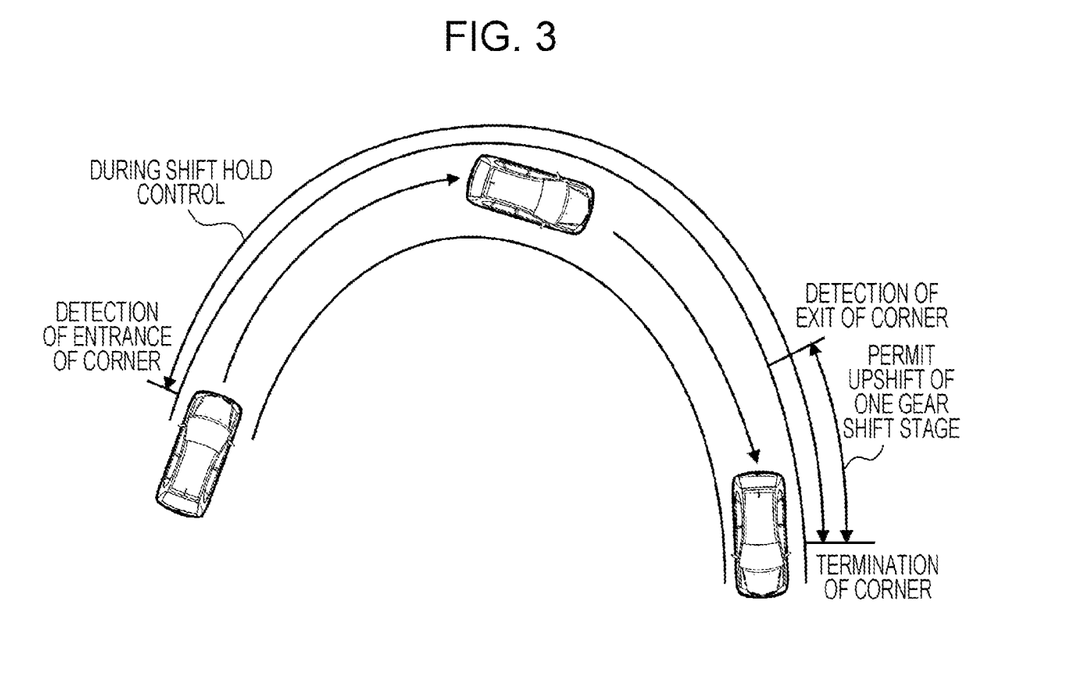
FIG. 3 is a schematic diagram for describing a status in which upshift is permitted during shift hold control according to the embodiment.

FIG. 3 is a schematic diagram for describing a status in which the upshift is permitted during the shift hold control according to the present embodiment. In the present embodiment, as illustrated in FIG. 3, the shift hold control is performed to prevent the upshift and keep the gear shift stage to a low shift stage side while the vehicle 100 is cornering. In the present embodiment, if the lateral acceleration of the vehicle 100, detected by the acceleration sensor 160, exceeds a predetermined threshold value, it is determined that the vehicle 100 is cornering to start the shift hold control. If the lateral acceleration of the vehicle 100, detected by the acceleration sensor 160, becomes lower than or equal to the predetermined threshold value after the shift hold control is started, it is determined that the cornering of the vehicle 100 is terminated to terminate the shift hold control.

The shift hold control in the related art has room for improvement in that the driver may feel that the engine rotation speed remains high; that is, the engine rotation speed may increase excessively near the exit of a corner resulting in a situation in which the engine sound becomes notably audible, thereby causing the driver to have a sense of discomfort. Accordingly, in the present embodiment, if the predetermined conditions are met during the shift hold control, the upshift of one gear shift stage is permitted, as illustrated in FIG. 3, to clear the sense of the engine rotation speed remaining high near the exit of the corner.

In the present embodiment, the predetermined conditions include a condition that the rotation speed of the turbine shaft 106d, which is the output shaft of the torque converter 106, be higher than a permitted turbine rotation speed. The permitted turbine rotation speed corresponds to an example of a first threshold value according to an embodiment of the disclosure. In other words, if the rotation speed of the turbine shaft 106d is higher than the permitted turbine rotation speed during the shift hold control, the upshift of one gear shift stage may be permitted.

The permitted turbine rotation speed is calculated with reference to a permitted turbine rotation speed calculation map, which is stored in the storage 180 in advance, in the present embodiment. The calculation of the permitted turbine rotation speed with reference to the permitted turbine rotation speed calculation map will be described in detail below. The permitted turbine rotation speed is defined in the permitted turbine rotation speed calculation map based on the driving intensity of the driver and an acceleration resultant force calculated from the lateral acceleration of the vehicle 100 and the deceleration of the vehicle 100.

In the present embodiment, the predetermined conditions include a condition that the accelerator opening of the vehicle 100 be greater than a permitted accelerator opening. The permitted accelerator opening corresponds to an example of a second threshold value according to an embodiment of the disclosure. In other words, if the accelerator opening of the vehicle 100 is greater than the permitted accelerator opening during the shift hold control, the upshift of one gear shift stage may be permitted. This enables the shift hold control to be continued without permitting the upshift even if the vehicle 100 runs with a relatively small accelerator opening along a long corner, such as a loop bridge, thus keeping a high rotation speed of the engine 102. The permitted accelerator opening may be varied for each gear shift stage, or the same value may be set for each gear shift stage as the permitted accelerator opening.

In the present embodiment, the predetermined conditions include a condition that an accelerator opening rate of change of the vehicle 100 be higher than a permitted accelerator opening rate of change. The permitted accelerator opening rate of change corresponds to an example of a third threshold value according to an embodiment of the disclosure. In other words, if the accelerator opening rate of change of the vehicle 100 is higher than the permitted accelerator opening rate of change during the shift hold control, the upshift of one gear shift stage may be permitted. Since this enables the upshift in a case in which the accelerator opening rate of change has a negative value, as in a case in which the accelerator pedal is released, not to be permitted, it is possible to suppress the upshift that is against the intention of control of the driver in a status in which the driver has no intention of accelerating. The permitted accelerator opening rate of change may be varied for each gear shift stage, or the same value may be set for each gear shift stage as the permitted accelerator opening rate of change.

Figure 4:
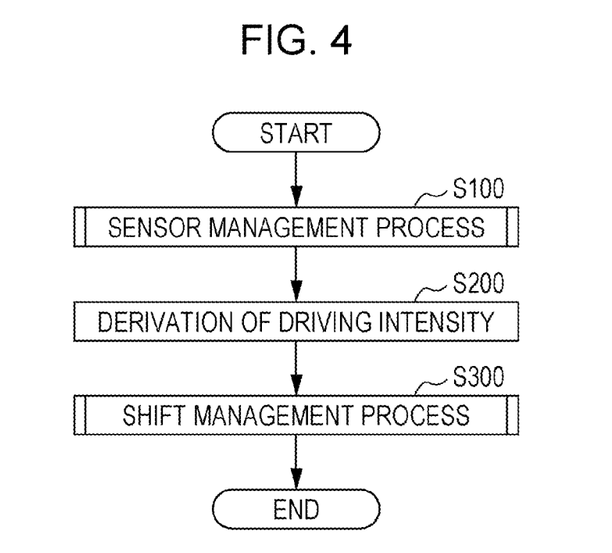
FIG. 4 is a flowchart illustrating an interruption process according to the embodiment.

FIG. 4 is a flowchart illustrating an interruption process according to the present embodiment. The control device 150 repeats the series of steps illustrated in FIG. 4 at every interruption timing occurring with a predetermined control period. At the interruption timing described above, in Step S100, the control device 150 performs a sensor management process described in detail below.

In Step S200, the deriver 154 in the control device 150 performs derivation of the driving intensity. In the present embodiment, the driving intensity is an index indicating the intensity of the driving of the vehicle 100 by the driver, as described above. The deriver 154 derives the driving intensity based on at least one of the current gear shift stage, the lateral acceleration of the vehicle 100, the deceleration of the vehicle 100, the vehicle speed of the vehicle 100, or the accelerator opening rate of change.

For example, candidates of the intensity value that is varied for each parameter are calculated at each interruption timing, the maximum value among the candidates is determined to be the intensity value at each timing, and the intensity values are accumulated. The value resulting from the above processing is the driving intensity. In the present embodiment, the driving intensity is increased as the driving of the vehicle 100 by the driver is more aggressive and is decreased as the driving of the vehicle 100 by the driver is gentler. The candidates described above includes, for example, the candidates calculated using the vehicle speed and the acceleration in the front-back direction, the candidates calculated using the gear shift stage and the engine rotation speed, the candidates calculated using the vehicle speed and the lateral acceleration, the candidates calculated using the vehicle speed and transition of the acceleration in the front-back direction, the candidates calculated using the vehicle speed and transition of the lateral acceleration, and the candidates calculated using the vehicle speed and the accelerator opening rate of change. In other words, the vehicle speed, the acceleration in the front-back direction, the gear shift stage, the engine rotation speed, the lateral acceleration, the transition of the acceleration in the front-back direction, the transition of the lateral acceleration, and the accelerator opening rate of change correspond to information about driving characteristics of the driver of the vehicle 100.

In Step S300, the control device 150 performs a shift management process described in detail below. Then, the interruption process illustrated in FIG. 4 is terminated.

Figure 5:
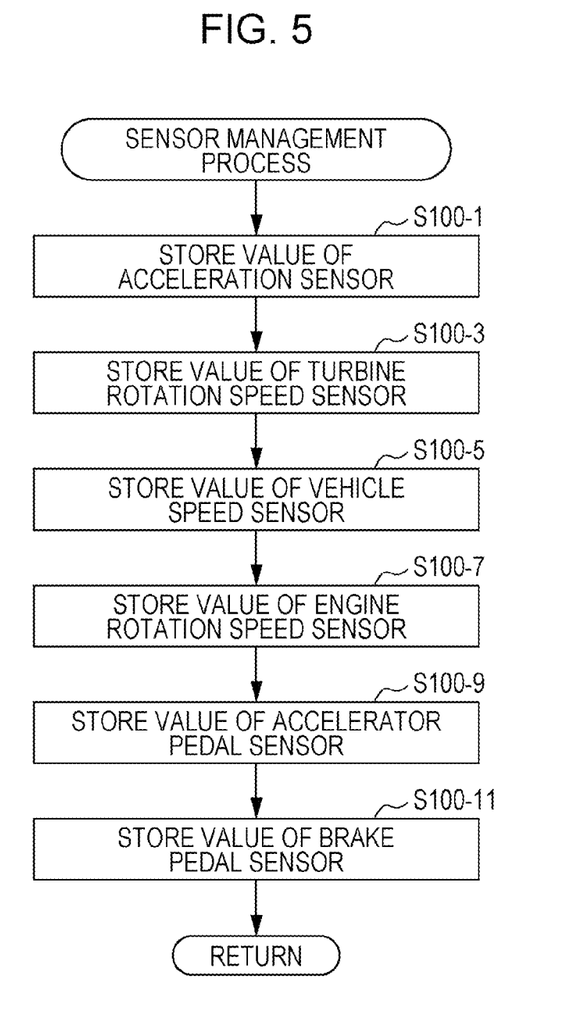
FIG. 5 is a flowchart illustrating a sensor management process according to the present embodiment.

FIG. 5 is a flowchart illustrating the sensor management process according to the present embodiment. Referring to FIG. 5, in Step S100-1, the controller 152 in the control device 150 acquires the value of the acceleration sensor 160 and stores the acquired value in the storage 180.

In Step S100-3, the controller 152 in the control device 150 acquires the value of the turbine rotation speed sensor 162 and stores the acquired value in the storage 180.

In Step S100-5, the controller 152 in the control device 150 acquires the value of the vehicle speed sensor 164 and stores the acquired value in the storage 180.

In Step S100-7, the controller 152 in the control device 150 acquires the value of the engine rotation speed sensor 166 and stores the acquired value in the storage 180.

In Step S100-9, the controller 152 in the control device 150 acquires the value of the accelerator pedal sensor 168 and stores the acquired value in the storage 180.

In Step S100-11, the controller 152 in the control device 150 acquires the value of the brake pedal sensor 170 and stores the acquired value in the storage 180. Then, the sensor management process illustrated in FIG. 5 is terminated.

Figure 6:
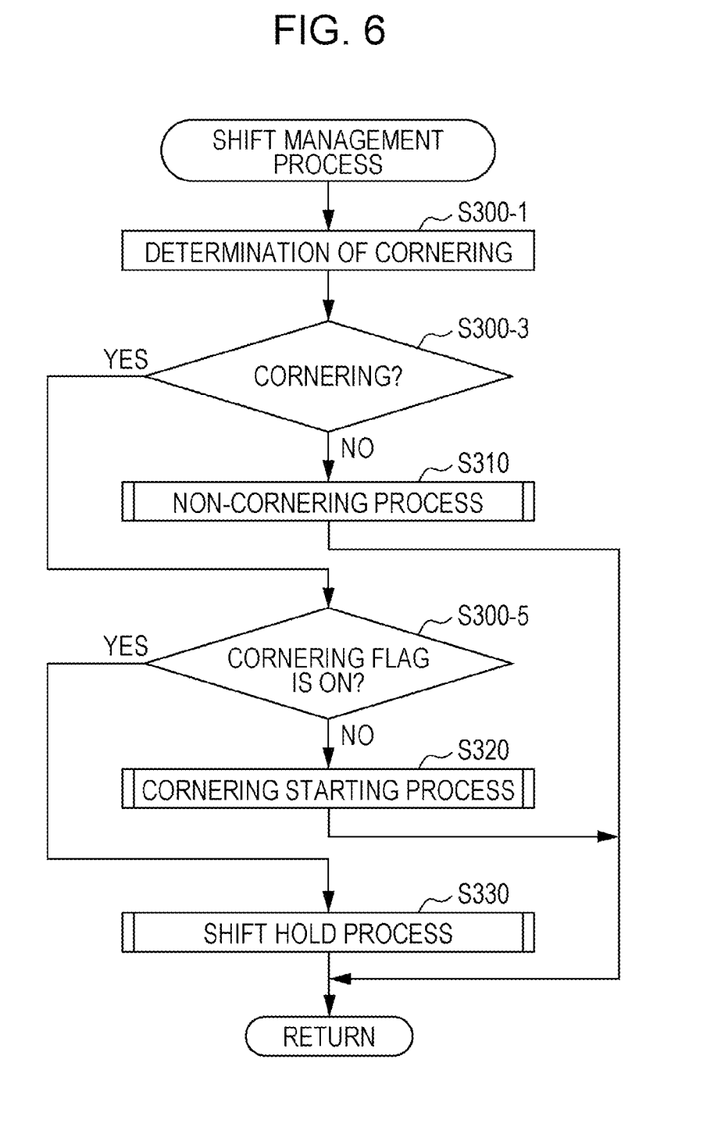
FIG. 6 is a flowchart illustrating a shift management process according to the embodiment.

FIG. 6 is a flowchart illustrating the shift management process according to the present embodiment. Referring to FIG. 6, in Step S300-1, the controller 152 in the control device 150 performs determination of cornering with reference to the value of the acceleration sensor 160 stored in Step S100-1. In the determination of cornering, the controller 152 in the control device 150 determines whether the vehicle 100 is cornering. For example, if the lateral acceleration detected by the acceleration sensor 160 exceeds the predetermined threshold value, the controller 152 in the control device 150 determines that the vehicle 100 is cornering. If the lateral acceleration detected by the acceleration sensor 160 does not exceed the predetermined threshold value, the controller 152 in the control device 150 determines that the vehicle 100 is not cornering.

In Step S300-3, the controller 152 in the control device 150 determines whether it is determined in Step S300-1 that the vehicle 100 is cornering.

If the controller 152 in the control device 150 determines that the vehicle 100 is not cornering (NO in Step S300-3), the process goes to Step S310. In Step S310, the controller 152 in the control device 150 performs a non-cornering process described in detail below. Then, the shift management process illustrated in FIG. 6 is terminated.

If the controller 152 in the control device 150 determines that the vehicle 100 is cornering (YES in Step S300-3), the process goes to Step S300-5. In Step S300-5, the controller 152 in the control device 150 determines whether a cornering flag indicating that the vehicle 100 is cornering is on.

If the controller 152 in the control device 150 determines that the cornering flag is off (NO in Step S300-5), the process goes to Step S320. In Step S320, the controller 152 in the control device 150 performs a cornering starting process described in detail below. Then, the shift management process illustrated in FIG. 6 is terminated.

If the controller 152 in the control device 150 determines that the cornering flag is on (YES in Step S300-5), the process goes to Step S330. In Step S330, the controller 152 in the control device 150 performs a shift hold process described in detail below. Then, the shift management process illustrated in FIG. 6 is terminated. In the present embodiment, the shift hold control to prevent the upshift of the transmission 110 is performed when the cornering flag is turned on.

Figure 7:
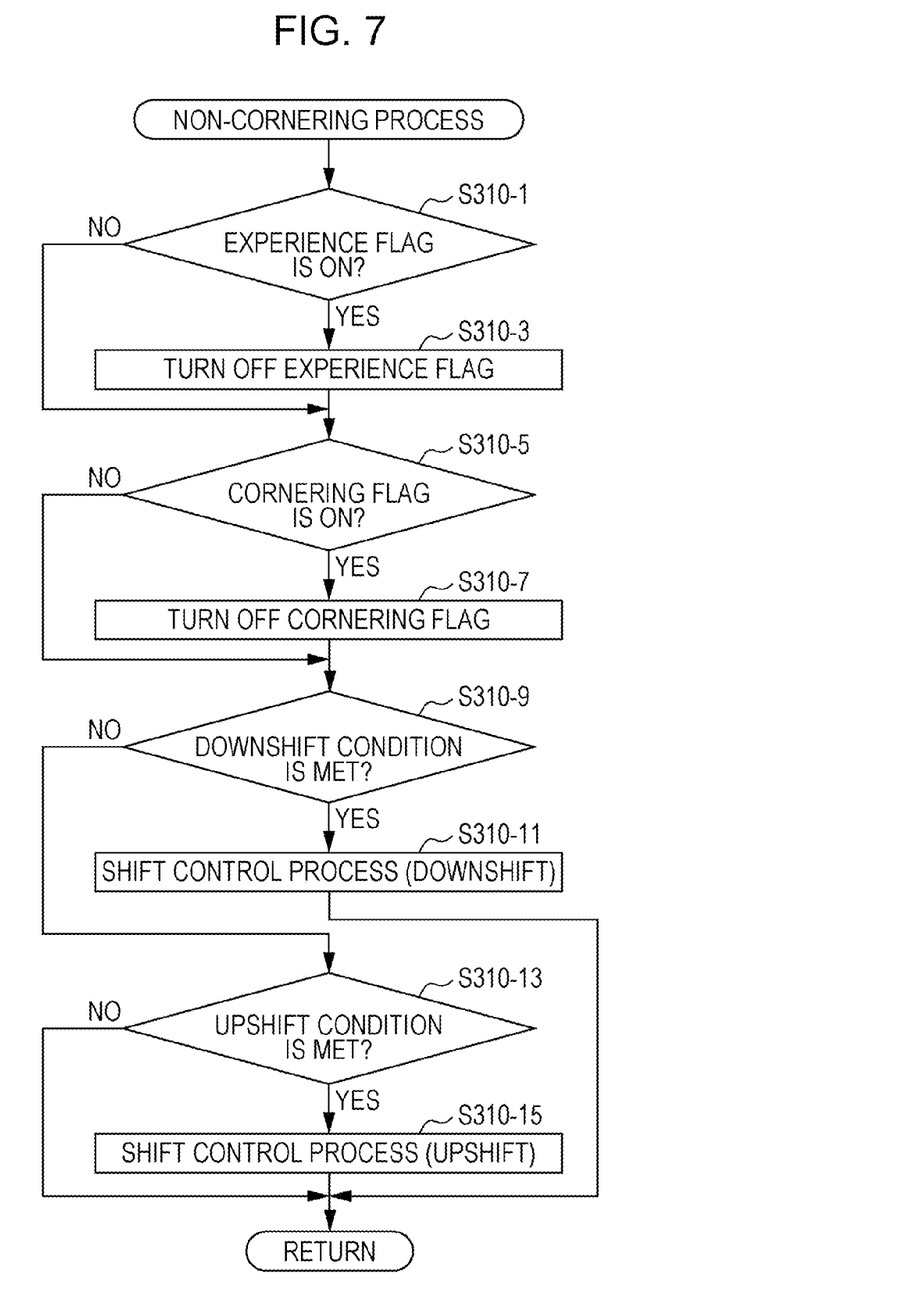
FIG. 7 is a flowchart illustrating a non-cornering process according to the embodiment.

FIG. 7 is a flowchart illustrating the non-cornering process according to the present embodiment. Referring to FIG. 7, in Step S310-1, the controller 152 in the control device 150 determines whether an experience flag is on. The experience flag indicates that the upshift of one stage has been performed during the shift hold control. In the present embodiment, if the experience flag indicating that the upshift of one stage has been performed during the shift hold control is off, that is, if a state in which all the predetermined conditions described above are met is continued for a predetermined time period in a state in which the upshift has not been performed during the shift hold control, the upshift is permitted.

If the controller 152 in the control device 150 determines that the experience flag is on (YES in Step S310-1), the process goes to Step S310-3. In Step S310-3, the controller 152 in the control device 150 turns off the experience flag.

If the controller 152 in the control device 150 determines that the experience flag is off (NO in Step S310-1), the process goes to Step S310-5. In Step S310-5, the controller 152 in the control device 150 determines whether the cornering flag is on.

If the controller 152 in the control device 150 determines that the cornering flag is on (YES in Step S310-5), the process goes to Step S310-7. In Step S310-7, the controller 152 in the control device 150 turns off the cornering flag.

If the controller 152 in the control device 150 determines that the cornering flag is off (NO in Step S310-5), the process goes to Step S310-9. In Step S310-9, the controller 152 in the control device 150 determines whether a predetermined downshift condition is met with reference to the gear shift map stored in the storage 180.

If the controller 152 in the control device 150 determines that the downshift condition is met (YES in Step S310-9), the process goes to Step S310-11. In Step S310-11, the controller 152 in the control device 150 performs a shift control process for performing downshift to switch the gear shift stage from a high shift stage side to the low shift stage side. Then, the non-cornering process illustrated in FIG. 7 is terminated.

If the controller 152 in the control device 150 determines that the downshift condition is not met (NO in Step S310-9), the process goes to Step S310-13. In Step S130-13, the controller 152 in the control device 150 determines whether a predetermined upshift condition is met with reference to the gear shift map stored in the storage 180. If the controller 152 in the control device 150 determines that the upshift condition is not met (NO in Step S310-13), the non-cornering process illustrated in FIG. 7 is terminated.

If the controller 152 in the control device 150 determines that the upshift condition is met (YES in Step S310-13), the process goes to Step S310-15. In Step S310-15, the controller 152 in the control device 150 performs a shift control process for performing the upshift to switch the gear shift stage from the low shift stage side to the high shift stage side. Then, the non-cornering process illustrated in FIG. 7 is terminated.

Figure 8:
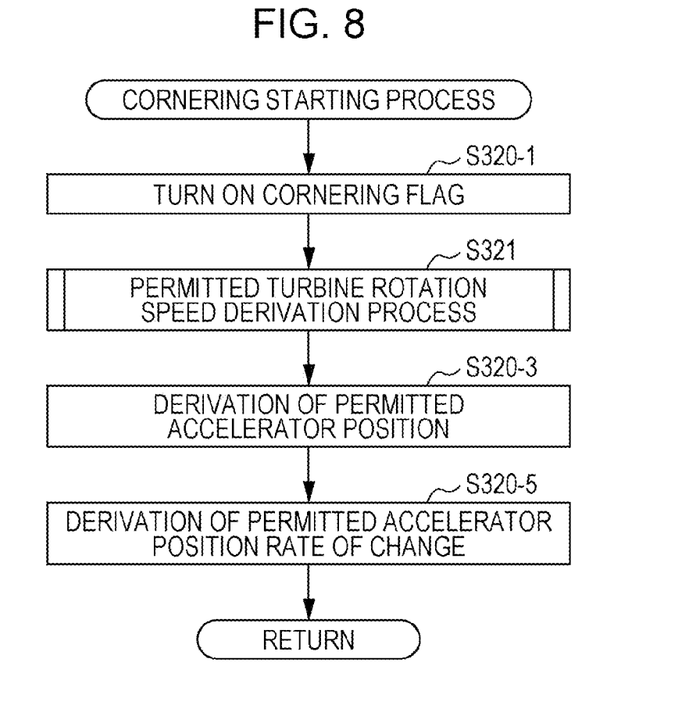
FIG. 8 is a flowchart illustrating a cornering starting process according to the embodiment.

FIG. 8 is a flowchart illustrating the cornering starting process according to the present embodiment. Referring to FIG. 8, in Step S320-1, the controller 152 in the control device 150 turns on the cornering flag.

In Step S321, the controller 152 in the control device 150 performs a permitted turbine rotation speed derivation process described in detail below.

In Step S320-3, the controller 152 in the control device 150 performs derivation of the permitted accelerator opening.

In Step S320-5, the controller 152 in the control device 150 performs derivation of the permitted accelerator opening rate of change. Then, the cornering starting process illustrated in FIG. 8 is terminated.

Figure 9:
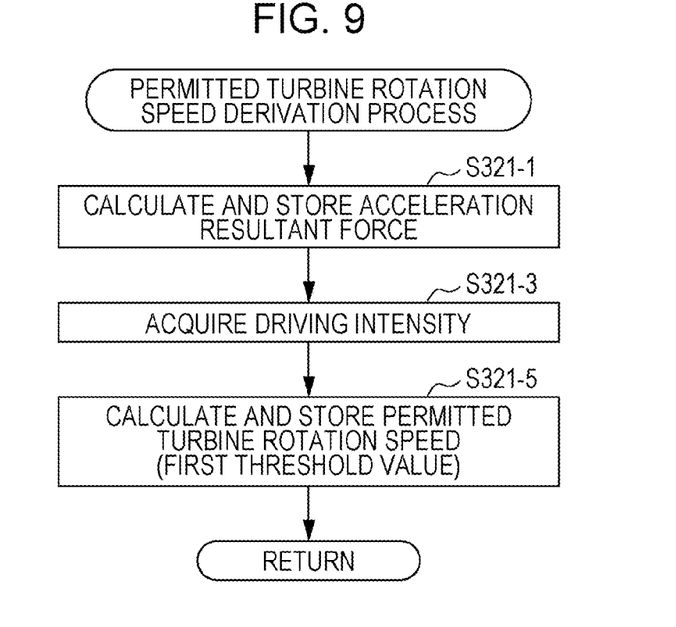
FIG. 9 is a flowchart illustrating a permitted turbine rotation speed derivation process according to the embodiment.

FIG. 9 is a flowchart illustrating the permitted turbine rotation speed derivation process according to the present embodiment. Referring to FIG. 9, in Step S321-1, the controller 152 in the control device 150 calculates the acceleration resultant force based on the lateral acceleration of the vehicle 100 and the deceleration of the vehicle 100 with reference to an acceleration resultant force calculation map stored in the storage 180 and stores the calculated acceleration resultant force in the storage 180.

The acceleration resultant force is defined in the acceleration resultant force calculation map based on the lateral acceleration of the vehicle 100 and the deceleration of the vehicle 100. In other words, the acceleration resultant force in the present embodiment is an index indicating the magnitude of the acceleration applied to the vehicle 100 and the acceleration resultant force is defined in consideration of both the acceleration in the lateral direction and the acceleration in the front-back direction. The acceleration resultant force calculation map is set so that the acceleration resultant force is increased as the lateral acceleration is increased and the acceleration resultant force is increased as the deceleration is increased.

In Step S321-3, the controller 152 in the control device 150 acquires the driving intensity stored in the storage 180 in Step S200.

In Step S321-5, the controller 152 in the control device 150 calculates the permitted turbine rotation speed based on the acceleration resultant force calculated in Step S321-1 and the driving intensity acquired in Step S321-3 with reference to the permitted turbine rotation speed calculation map stored in the storage 180 and stores the calculated permitted turbine rotation speed in the storage 180. Then, the permitted turbine rotation speed derivation process illustrated in FIG. 9 is terminated.

In the present embodiment, the permitted turbine rotation speed calculation map is set so that the permitted turbine rotation speed is increased as the acceleration resultant force is increased. In other words, the controller 152 in the control device 150 varies the permitted turbine rotation speed based on the lateral acceleration of the vehicle 100 and the deceleration of the vehicle 100. In the above case, the determination of the exit of a corner in consideration of the acceleration in the front-back direction, in addition to the variation in the lateral acceleration, enables more detailed determination of the exit of a corner. Accordingly, it is possible to suppress a phenomenon of the upshift being permitted during transition from a first corner to a second corner in a situation in which the corners are continuously encountered.

In addition, in the present embodiment, the permitted turbine rotation speed calculation map is set so that the permitted turbine rotation speed is increased as the driving intensity is increased. In other words, the controller 152 in the control device 150 varies the permitted turbine rotation speed based on the information about the driving characteristics of the driver of the vehicle 100. Since a relatively low permitted turbine rotation speed is calculated during so-called normal driving in which the driver drives the vehicle 100 gently in the above case, the upshift of one gear shift stage is likely to be permitted near the exit of a corner where the driver is often annoyed with the high engine rotation speed, thus clearing the sense of the engine rotation speed remaining high near the exit of the corner. In addition, since a relatively high permitted turbine rotation speed is calculated during so-called sports driving in which the driver drives the vehicle 100 aggressively, for example, in a case in which the driver drives the vehicle 100 in a circuit, the upshift is less likely to be permitted near the exit of a corner, thus keeping the high engine rotation speed.

Figure 10:
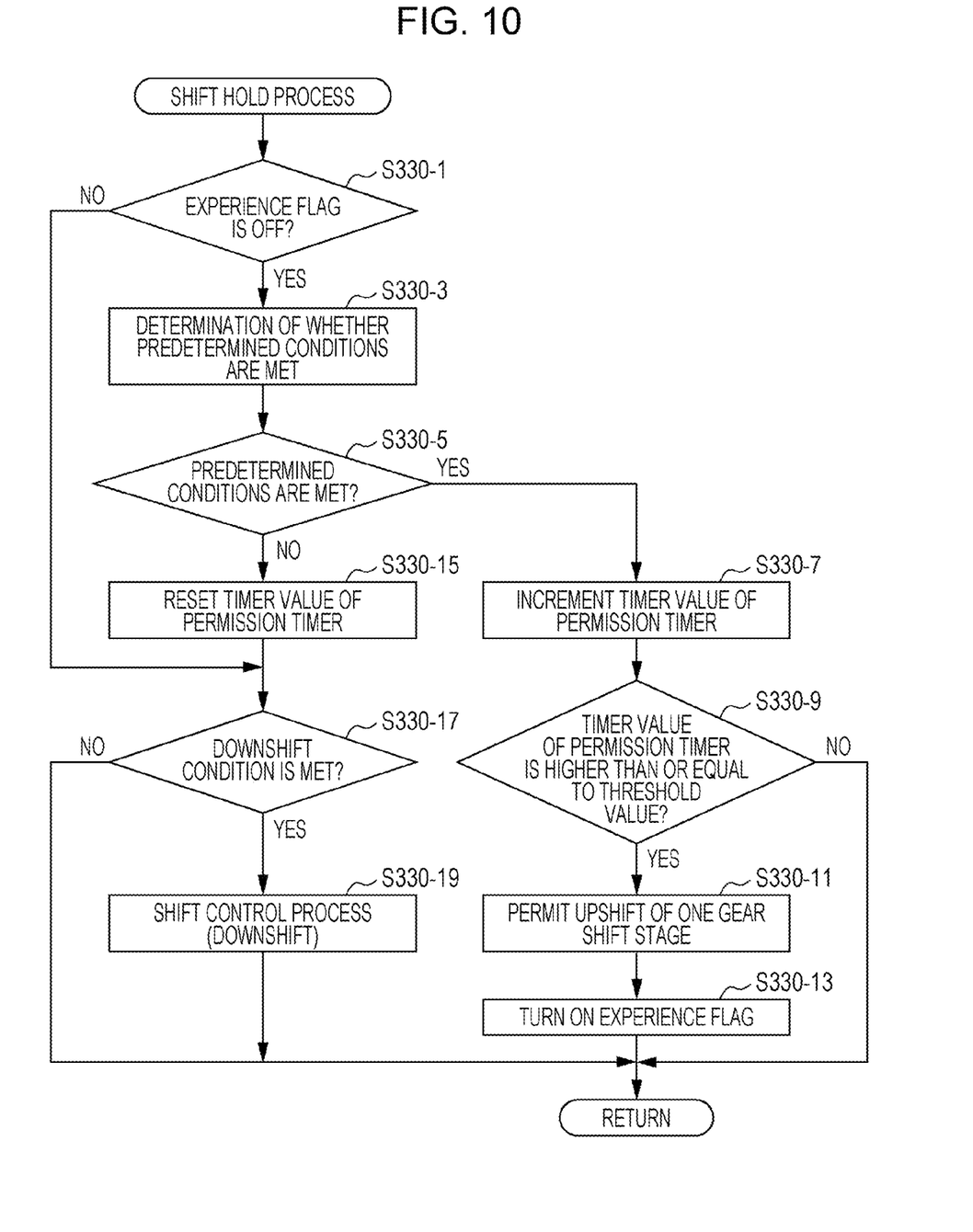
FIG. 10 is a flowchart illustrating a shift hold process according to the embodiment.

FIG. 10 is a flowchart illustrating the shift hold process according to the present embodiment. Referring to FIG. 10, in Step S330-1, the controller 152 in the control device 150 determines whether the experience flag is off.

If the controller 152 in the control device 150 determines that the experience flag is off (YES in Step S330-1), the process goes to Step S330-3. In Step S330-3, the controller 152 in the control device 150 determines whether the predetermined conditions are met. In the present embodiment, the controller 152 in the control device 150 determines that the predetermined conditions are met if the rotation speed of the turbine shaft 106d is higher than the permitted turbine rotation speed, the accelerator opening of the vehicle 100 is greater than the permitted accelerator opening, and the accelerator opening rate of change of the vehicle 100 is higher than the permitted accelerator opening rate of change.

However, the controller 152 in the control device 150 may determine that the predetermined condition is met if the rotation speed of the turbine shaft 106d is higher than the permitted turbine rotation speed. The controller 152 in the control device 150 may determine that the predetermined condition is met if the accelerator opening of the vehicle 100 is greater than the permitted accelerator opening. The controller 152 in the control device 150 may determine that the predetermined condition is met if the accelerator opening rate of change of the vehicle 100 is higher than the permitted accelerator opening rate of change.

Alternatively, the controller 152 in the control device 150 may determine that the predetermined conditions are met if the rotation speed of the turbine shaft 106d is higher than the permitted turbine rotation speed and the accelerator opening of the vehicle 100 is greater than the permitted accelerator opening.

Alternatively, the controller 152 in the control device 150 may determine that the predetermined conditions are met if the rotation speed of the turbine shaft 106d is higher than the permitted turbine rotation speed and the accelerator opening rate of change of the vehicle 100 is higher than the permitted accelerator opening rate of change.

Alternatively, the controller 152 in the control device 150 may determine that the predetermined conditions are met if the accelerator opening of the vehicle 100 is greater than the permitted accelerator opening and the accelerator opening rate of change of the vehicle 100 is higher than the permitted accelerator opening rate of change.

In Step S330-5, the controller 152 in the control device 150 determines whether it is determined in Step S330-3 that the predetermined conditions are met.

If the controller 152 in the control device 150 determines that the predetermined conditions are met (YES in Step S330-5), the process goes to Step S330-7. In Step S330-7, the controller 152 in the control device 150 increments the timer value of a permission timer.

In Step S330-9, the controller 152 in the control device 150 determines whether the timer value of the permission timer incremented in Step S330-7 is higher than or equal to a predetermined threshold value. If the controller 152 in the control device 150 determines that the timer value of the permission timer is not higher than and not equal to the predetermined threshold value (NO in Step S330-9), the shift hold process illustrated in FIG. 10 is terminated.

If the controller 152 in the control device 150 determines that the timer value of the permission timer is higher than or equal to the predetermined threshold value (YES in Step S330-9), the process goes to Step S330-11. In Step S330-11, the controller 152 in the control device 150 permits the upshift for switching from the low shift stage side to the high shift stage side by using one gear shift stage to perform the upshift.

In Step S330-13, the controller 152 in the control device 150 turns on the experience flag. Then, the shift hold process illustrated in FIG. 10 is terminated.

If the controller 152 in the control device 150 determines that the predetermined conditions are not met (NO in Step S330-5), the process goes to Step S330-15. In Step S330-15, the controller 152 in the control device 150 resets the timer value of the permission timer.

If the controller 152 in the control device 150 determines that the experience flag is on (NO in Step S330-1), the process goes to Step S330-17. In Step S330-17, the controller 152 in the control device 150 determines whether the predetermined downshift condition is met with reference to the gear shift map stored in the storage 180. If the controller 152 in the control device 150 determines that the predetermined downshift condition is not met (NO in Step S330-17), the shift hold process illustrated in FIG. 10 is terminated.

If the controller 152 in the control device 150 determines that the predetermined downshift condition is met (YES in Step S330-17), the process goes to Step S330-19. In Step S330-19, the controller 152 in the control device 150 performs the shift control process to perform the downshift from the high shift stage side to the low shift stage side. Then, the shift hold process illustrated in FIG. 10 is terminated.

As described above, in the present embodiment, if the lateral acceleration detected by the acceleration sensor 160 exceeds the predetermined threshold value, it is determined that the vehicle 100 is cornering and the cornering flag is turned on. When the cornering flag is on, the shift hold process to prevent the upshift of the transmission 110 is performed. When the upshift of one gear shift stage is permitted to perform the upshift in Step S330-11, the experience flag is turned on in Step S330-13. Accordingly, in the shift hold process at the subsequent interruption timings, the determination is NO in Step S330-1 and the process goes to Step S330-17. Consequently, the upshift is not performed even if the predetermined conditions are met in the shift hold process at the subsequent interruption timings.

Although the embodiments of the disclosure are described above with reference to the accompanying drawings, the disclosure is not limited to the embodiments described above. Various changes or modifications may be made by the person skilled in the art within the scope of the claims and the changes or modifications are included in the technical scope of the disclosure.

The case is described in the above embodiments in which the rotation speed itself of the turbine shaft 106d is used as the index value indicating the rotation speed of the turbine shaft 106d. However, the rotation speed itself of the turbine shaft 106d is not limitedly used and any index value indicating the rotation speed of the turbine shaft 106d may be used as long as the index value is correlated with the rotation speed of the turbine shaft 106d. For example, the rotation speed of any power transmission system may be used as the index value indicating the rotation speed of the turbine shaft 106d. For example, the engine rotation speed may be used as the index value.

According to the disclosure, it is possible to suppress an occurrence of a sense of discomfort of the driver.

The control device 150 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 150 including the controller 152 and the deriver 154. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle comprising:
an engine;
a torque converter coupled to the engine;
a transmission coupled to the torque converter; and
a control device configured to control operation of the transmission,
wherein the control device comprises a controller configured to perform shift hold control to prevent upshift of the transmission based on a lateral acceleration value of the vehicle,
wherein the controller is configured to permit the upshift of the transmission by only one gear shift stage in a case where a predetermined condition is met in the shift hold control, and
wherein the predetermined condition comprises a condition that an index value indicating a rotation speed of an output shaft of the torque converter be higher than a first threshold value.

2. The vehicle according to claim 1,
wherein the controller is configured to vary the first threshold value based on the lateral acceleration value of the vehicle and a deceleration value of the vehicle.

3. The vehicle according to claim 1,
wherein the controller is configured to vary the first threshold value based on information about driving characteristics of a driver who drives the vehicle.

4. The vehicle according to claim 2,
wherein the controller is configured to vary the first threshold value based on information about driving characteristics of a driver who drives the vehicle.

5. The vehicle according to claim 1,
wherein the predetermined condition comprises a condition that an opening degree of an accelerator of the vehicle be greater than a second threshold value.

6. The vehicle according to claim 2,
wherein the predetermined condition comprises a condition that an opening degree of an accelerator of the vehicle be greater than a second threshold value.

7. The vehicle according to claim 3,
wherein the predetermined condition comprises a condition that an opening degree of an accelerator of the vehicle be greater than a second threshold value.

8. The vehicle according to claim 4,
wherein the predetermined condition comprises a condition that an opening degree of an accelerator of the vehicle be greater than a second threshold value.

9. The vehicle according to claim 1,
wherein the predetermined condition comprises a condition that a rate of change in an opening degree of the accelerator of the vehicle be higher than a third threshold value.

10. The vehicle according to claim 2,
wherein the predetermined condition comprises a condition that a rate of change in an opening degree of the accelerator of the vehicle be higher than a third threshold value.

11. The vehicle according to claim 3,
wherein the predetermined condition comprises a condition that a rate of change in an opening degree of the accelerator of the vehicle be higher than a third threshold value.

12. The vehicle according to claim 4,
wherein the predetermined condition comprises a condition that a rate of change in an opening degree of the accelerator of the vehicle be higher than a third threshold value.

13. The vehicle according to claim 5,
wherein the predetermined condition comprises a condition that a rate of change in the opening degree of the accelerator be higher than a third threshold value.

14. The vehicle according to claim 6,
wherein the predetermined condition comprises a condition that a rate of change in the opening degree of the accelerator be higher than a third threshold value.

15. The vehicle according to claim 7,
wherein the predetermined condition comprises a condition that a rate of change in the opening degree of the accelerator be higher than a third threshold value.

16. The vehicle according to claim 8,
wherein the predetermined condition comprises a condition that a rate of change in the opening degree of the accelerator be higher than a third threshold value.

\* \* \* \* \*